(12) United States Patent
Nanda

(10) Patent No.: US 7,484,384 B2
(45) Date of Patent: Feb. 3, 2009

(54) BOIL OFF GAS CONDENSER

(75) Inventor: Rajeev Nanda, Houston, TX (US)

(73) Assignee: Technip USA Inc., Houston, TX (US)

( * ) Notice: Subject to any disclaimer, the term of this patent is extended or adjusted under 35 U.S.C. 154(b) by 371 days.

(21) Appl. No.: 11/378,546

(22) Filed: Mar. 18, 2006

(65) Prior Publication Data

US 2007/0214831 A1   Sep. 20, 2007

(51) Int. Cl.
*F25J 1/00*   (2006.01)
*F17C 3/10*   (2006.01)

(52) U.S. Cl. .............................. 62/614; 62/48.2; 62/903
(58) Field of Classification Search ............... 62/614, 62/903, 47.1, 48.2
See application file for complete search history.

(56) References Cited

U.S. PATENT DOCUMENTS

| | | | | |
|---|---|---|---|---|
| 4,394,139 A * | 7/1983 | Board | ............................. | 95/16 |
| 4,498,303 A * | 2/1985 | Heichberger | ................. | 62/606 |
| 5,486,318 A * | 1/1996 | McKeigue et al. | ........ | 261/112.2 |
| 5,925,291 A * | 7/1999 | Bharathan et al. | ........... | 261/69.1 |
| 6,449,983 B2 * | 9/2002 | Pozivil | ......................... | 62/613 |
| 6,470,706 B1 * | 10/2002 | Engdahl | ....................... | 62/614 |
| 6,551,465 B1 * | 4/2003 | Van Zile et al. | .............. | 202/158 |
| 6,558,515 B1 * | 5/2003 | Steacy | ............................ | 203/1 |
| 7,234,691 B2 * | 6/2007 | Kovak | ...................... | 261/114.1 |
| 2005/0126220 A1 * | 6/2005 | Ward | ............................ | 62/625 |
| 2006/0082006 A1 * | 4/2006 | Zone et al. | ..................... | 261/94 |

* cited by examiner

*Primary Examiner*—William C Doerrler
(74) *Attorney, Agent, or Firm*—O'Neil & M$^c$Connell, PLLC; R. Perry McConnell

(57) ABSTRACT

A boil off gas ("BOG") condenser for use in LNG handling facilities which provides compensation for transient pressure changes in BOG flow due to variations in operations.

18 Claims, 2 Drawing Sheets

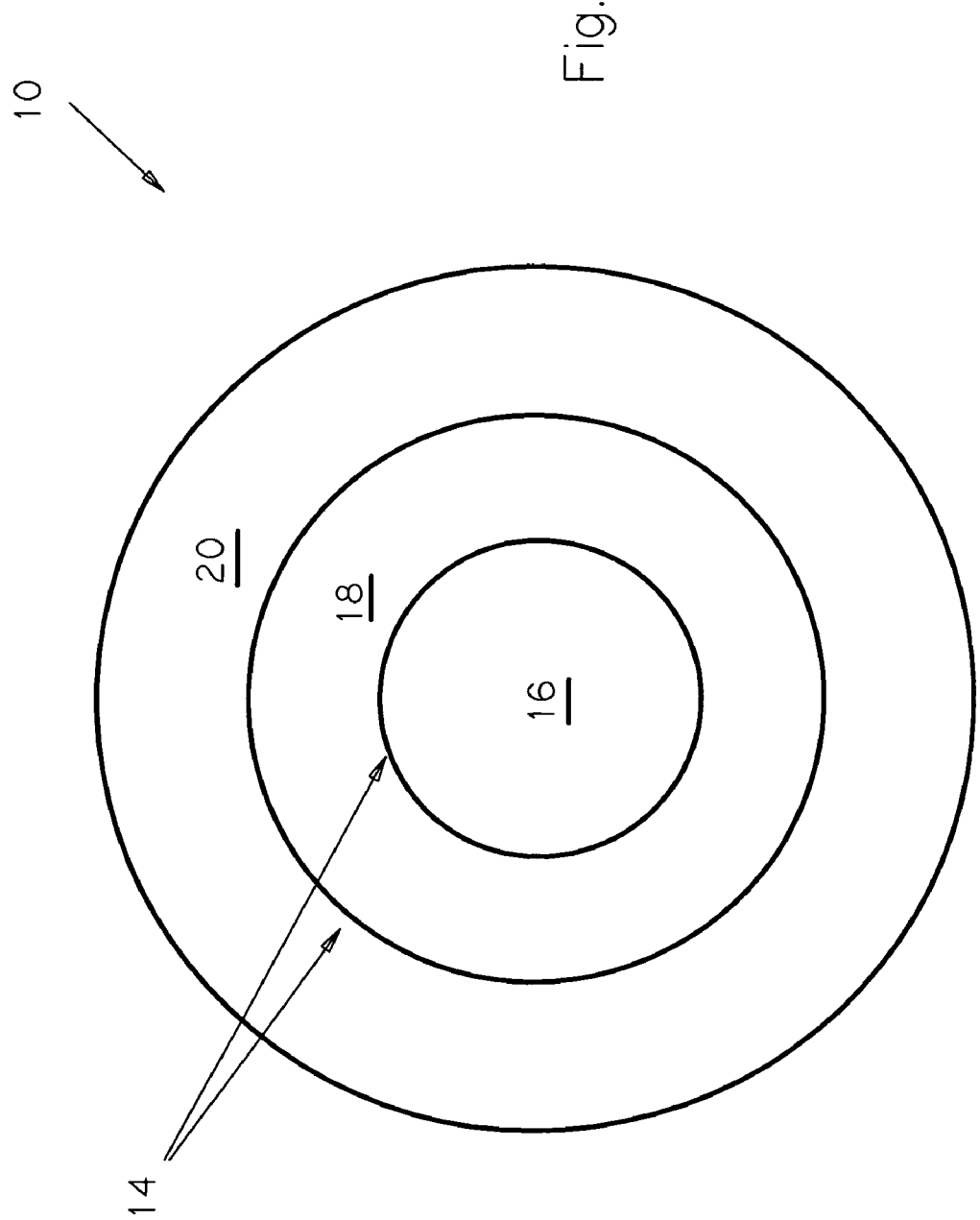

7,484,384 B2

BOIL OFF GAS CONDENSER

FIELD OF THE INVENTION

The invention pertains to efficiently condensing boil off gas for applications such as liquid natural gas terminals.

BACKGROUND OF THE INVENTION

Liquid natural gas ("LNG") terminals continuously generate boil off gas ("BOG"). This BOG is generated primarily due to heat leak from the atmosphere through tank insulation, unloading and recirculation line insulation, and from pumping energy and gas displacement from LNG storage tanks during ship unloading.

It is relatively easy to condense BOG in a counter flow packed tower, that is, a packed bed type condenser. However, much more BOG is created during unloading operations than during normal send-out operations.

There can be difficulty in controlling pressure during transient stages of operations, such as beginning or ending ship unloading. For send-out operations to remain uninterrupted, it is important that BOG condenser pressure be maintained. Failure to do so can create interruptions in delivery, because LNG send out pumps may trip and interrupt send-out flow.

Conventional BOG condensers comprise a condenser stack (a packed section) on the top of the condenser and a surge drum at the bottom. The surge drum is intended to provide surge volume for the LNG send out pumps. LNG from the send out pumps is commonly divided into two flow streams. The first LNG flow stream enters the top of the packed bed and is flow controlled. This first LNG flow stream is used to condense BOG introduced into the condenser. The second LNG flow stream is either fed into the top of the bottom drum and is level controlled, or can be connected to the suction header of the LNG send out pumps.

In such conventional designs, a BOG unloading compressor feeds BOG into the condenser stack at the bottom of the packed bed, to be condensed in the packed bed by the first LNG flow stream. The bottom section must simultaneously serve as a surge vessel for the LNG send out pumps and maintain a liquid level. Thus, this design is sensitive to transitions in operating volume, such as a substantial increase in BOG volume during ship offloading. It is desirable to reduce such pressure fluctuations and thereby improve the reliability of the terminal during all phases of operation.

Accordingly, it is an object of the invention to provide a BOG condenser which can maintain an appropriate operating pressure in multiple operation phases.

It is another object of the invention to provide a BOG condenser which is pressure-controllable through transient phases of terminal operation.

SUMMARY OF THE INVENTION

The invention is a BOG condenser which comprises a vessel with a vertically split bed, allowing BOG to be condensed in a plurality of separated condensation zones. LNG bottom fluid level in the vessel can be maintained by an overflow seal, or alternatively by a level control valve. The vessel is vertically split by dividers which extend downward below the bottom fluid level in the vessel. Packing is inserted between the dividers, and between the outermost divider and the vessel inner wall, thus forming separate packing zones.

LNG is controllably allowed to flow into the top zone of the vessel, preferably above the level of the top of the packing. A plurality of LNG inlet lines are used, preferably arranged so that each LNG inlet line provides LNG flow to a single packing zone. A plurality of control valves on the LNG inlet lines allows a controller to separately control LNG flow to each packing zone.

Similarly, BOG is controllably allowed to flow into the bottom of each packing zone, preferably below the level of the bottom of the packing. As mentioned above, the dividers preferably extend below the level of the LNG bottom fluid, thereby preventing gaseous communication between the BOG inlets. In other words, the packing zones are functionally separated from each other, thereby allowing BOG flow in each packing zone to be individually controlled. As with the LNG inlet lines, a plurality of control valves on the BOG inlet lines allows a controller to separately control BOG flow to each packing zone.

A controller measures total flow ratios of LNG and BOG into the vessel, as well as the pressure in a line from the top of the condenser, and controls flow through the LNG inlets and the BOG inlets via their respective control valves to control the overall flow to the various packing zones. Thus, the controller can insure that the vessel is maintained within desired pressure and temperature ranges throughout a variety of BOG pressure and flow conditions. In the preferred embodiment, the vessel will maintain pressures in the range of 50 to 105 psia and temperatures in the range of −215 to −256° F.

During normal operations, the BOG condenser of this invention may operate using only one packing zone, to provide only the specifically needed surface area to accomplish the needed heat and mass transfer. Under increased BOG flow rates, the controller may be programmed to allow flow through one or more additional packing zone, so that the needed surface area is provided to avoid pressure fluctuations.

The number of dividers and the volumes of and amount and type of packing in the several packing zones are matters of engineering choice and appropriateness for the design requirements of the BOG condenser. As those of skill in the art will recognize, the relative sizes and capacities of the packing zones may be altered to accommodate the expected variations in BOG flow and pressure at a particular location.

BRIEF DESCRIPTION OF THE DRAWING

FIG. 1A is a cross-sectioned schematic representation of a top view of one embodiment of the invention.

DETAILED DESCRIPTION

Figure 1:
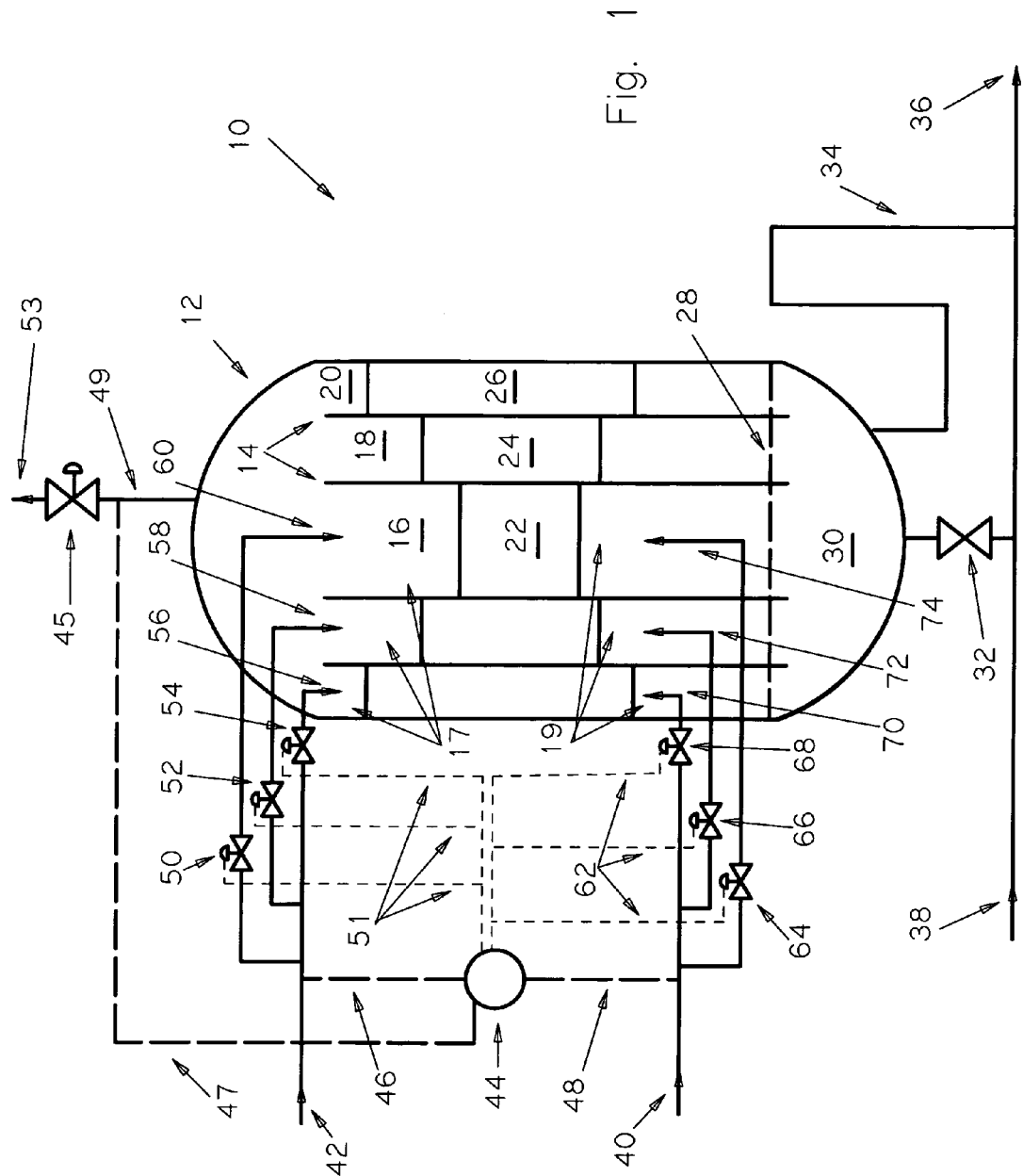
FIG. 1 is a cross-sectioned schematic representation of a side view of one embodiment of the invention.

Referring to FIGS. 1 and 1A, a schematic representation of an embodiment of the invention and depicting its process is shown. A BOG condenser 10 comprises a vessel 12 and interior dividers 14 within the vessel 12. In the example shown, the dividers 14 are cylindrical and coaxial, resulting in cylindrical packing zone 16 and annular packing zones 18 and 20. Packing 22, 24, and 26 is positioned within the packing zones 16, 18, and 20 respectively, and may be sized appropriately for the pressure and flow rates at which each individual packing zone is desired to operate. Packing 22, 24, and 26 thus divides each of packing zones 16, 18, and 20 into a respective upper section 17 and lower section 19. Those of skill in the art will recognize that the number of packing zones used and their relative volumes are a matter of engineering choice appropriate to the installation.

LNG bottom fluid 30 in vessel 12 maintains a LNG fluid level 28 controlled by overflow seal 34 or other appropriate level control. Overflow seal 34 may be in fluid communication with LNG outlet 36. Alternatively, those of skill in the art will recognize that a separate vessel (not shown) can be provided below the BOG condenser for hold up. Drain valve 32 allows vessel 12 to be completely drained when out of service.

LNG fluid level 28 is above the bottom of dividers 14, thereby providing functional isolation between each packing zone so that BOG fed into each packing zone by BOG inlets 70, 72, and 74 cannot escape from one packing zone to another. In other words, there is no direct gaseous flow path between the lower sections 19 of the respective packing zones. BOG can only flow upward through the packing in its respective packing zone, to be substantially condensed by the LNG flowing downward.

As those of skill in the art will recognize, other means than the LNG bottom fluid level 18 may be used to provide a gas seal at the bottom of the lower sections 19 of the packing zones, without departing from the spirit of the invention. However, the recited arrangement simultaneously provides a gas seal and efficient recovery of condensed BOG.

BOG enters via BOG inlet 40, and divides into a plurality of BOG inlets 70, 72, and 74, preferably corresponding to the number of packing zones (16, 18, and 20 in the example shown). Similarly, LNG enters via LNG inlet 42, and divides into a plurality of LNG inlets 56, 58, and 60. The amount of LNG provided via LNG inlets 56, 58, and 60 is only the amount needed to condense BOG. The remainder of the LNG supply is directed through LNG inlet 38.

Thus, BOG is fed into the lower sections 19 of the packing zones, and LNG is fed into the upper sections 17 of the packing zones. A controller, such as programmable controller 44 is provided information regarding the flow rates of the inlet BOG and LNG via data lines 48 and 46, respectively, as well as the pressure in the line 49 from the top of vessel 12 via data line 47. Control valve 45 provides a controllable outlet to a flow path 53, such as a vent (not shown).

Based on the BOG to LNG flow ratios and the pressure in the line 49 from the top of the vessel 12, controller 44 controls LNG flow control valves 50, 52, and 54 via control lines 51, and BOG flow control valves 64, 66, and 68 via control lines 62. For example, one or more packing zones may be shut off completely, or allowed to flow at a less than full-flow rate. In this way, control of the overall vessel pressure is possible that will allow the BOG condenser to compensate for BOG pressure fluctuations encountered during various operations. As those of skill in the art will recognize, programmable controller 44 may be replaced by a non-programmable controller (not shown), or even with manual controls without departing from the spirit of the invention.

The above examples are included for demonstration purposes only and not as limitations on the scope of the invention. Other variations in the construction of the invention may be made without departing from the spirit of the invention, and those of skill in the art will recognize that these descriptions are provide by way of example only.

I claim:

1. A boil off gas ("BOG") condenser, comprising
    a vessel comprising a plurality of packing zones, wherein each of said packing zones comprises an upper section and a lower section, and wherein said packing zones are substantially functionally isolated from each other,
    a plurality of liquid natural gas ("LNG") inlets in fluid communication with said upper sections of said plurality of packing zones, wherein the flow of LNG through said LNG inlets is selectively controllable, and
    a plurality of BOG inlets in fluid communication with said lower sections of said plurality of packing zones, wherein the flow of BOG through said BOG inlets is selectively controllable.

2. The boil off gas condenser of claim 1, wherein said vessel contains LNG bottom fluid, and wherein direct gaseous flow between said lower sections of said packing zones is prevented by said LNG bottom fluid.

3. The boil off gas condenser of claim 1, wherein said vessel contains LNG bottom fluid, and wherein the level of said LNG bottom fluid is controllable.

4. The boil off gas condenser of claim 3, additionally comprising an overflow seal capable of controlling the level of said LNG bottom fluid.

5. The boil off gas condenser of claim 1, additionally comprising a controller.

6. The boil off gas condenser of claim 5, wherein said controller is programmable.

7. The boil off gas condenser of claim 5, wherein said controller controls LNG flow to each of said packing zones.

8. The boil off gas condenser of claim 5, wherein said controller controls BOG flow to each of said packing zones.

9. The boil off gas condenser of claim 5, wherein said controller determines LNG and BOG flow to each of said packing zones based on LNG and BOG inlet flow ratios and the pressure in said vessel.

10. The boil off gas condenser of claim 5, wherein said controller determines LNG and BOG flow to each of said packing zones based on the pressure in said vessel.

11. A method of condensing boil off gas ("BOG") comprising,
    creating a plurality of packing zones within a vessel,
    controllably dividing the flow of inlet BOG into said plurality of packing zones,
    controllably dividing the flow of inlet liquid natural gas ("LNG") into said plurality of packing zones, and
    condensing said BOG in packing in each of said packing zones through interaction with said LNG.

12. The method of claim 11, additionally comprising the step of
    controlling the rate of flow of LNG into each packing zone.

13. The method of claim 11, additionally comprising the step of
    controlling the rate of flow of BOG into each packing zone.

14. The method of claim 11, additionally comprising the steps of
    controlling the rate of flow of LNG into each packing zone, and
    essentially simultaneously controlling the rate of flow of BOG into each packing zone.

15. The method of claim 11, additionally comprising the step of
    maintaining LNG bottom fluid in said vessel at a selected level.

16. The method of claim 15, additionally comprising the step of
    selecting the LNG bottom fluid level to provide functional isolation between said packing zones.

17. The method of claim 11, additionally comprising the steps of
- determining the LNG inlet flow rate,
- determining the BOG inlet flow rate,
- determining the pressure in said vessel, and
- controlling the flow of LNG and BOG to each of said packing zones based on the BOG to LNG flow ratio and the pressure in said vessel.

18. The method of claim 11, additionally comprising the steps of
- determining the pressure in said vessel, and
- controlling the flow of LNG and BOG to each of said packing zones based on the pressure in said vessel.

* * * * *